United States Patent [19]

Chinomi

[11] Patent Number: 5,052,754
[45] Date of Patent: Oct. 1, 1991

[54] HEADREST ARRANGEMENT

[75] Inventor: Isamu Chinomi, Kanagawa, Japan

[73] Assignee: Ikeda Bussan Co., Ltd., Ayase, Japan

[21] Appl. No.: 484,878

[22] Filed: Feb. 26, 1990

[30] Foreign Application Priority Data

Mar. 31, 1989 [JP] Japan .............................. 1-38621[U]

[51] Int. Cl.⁵ .............................................. A47C 1/10
[52] U.S. Cl. ..................................... 297/408; 297/410
[58] Field of Search ............... 297/408, 410, 403, 409, 297/391

[56] References Cited

U.S. PATENT DOCUMENTS

| | | | |
|---|---|---|---|
| 4,191,423 | 3/1980 | Goldner | 297/410 X |
| 4,606,578 | 8/1986 | Yasui | 297/408 |
| 4,637,655 | 1/1987 | Fourrey et al. | 297/408 X |
| 4,668,014 | 5/1987 | Boisset | 297/408 |
| 4,761,034 | 8/1988 | Saito | 297/408 |
| 4,765,683 | 8/1988 | Hattori | 297/408 X |
| 4,798,415 | 1/1989 | Tanino et al. | 297/408 X |
| 4,807,934 | 2/1989 | Sakakibara et al. | 297/408 X |
| 4,830,434 | 5/1989 | Ishida et al. | 297/408 |

FOREIGN PATENT DOCUMENTS 2355483  1/1978  France ................................ 297/410

Primary Examiner—Jose V. Chen
Attorney, Agent, or Firm—Foley & Lardner

[57] ABSTRACT

An automotive vehicle headrest arrangement in which a headrest body is attached to a seat back so as to be controllably movable in a vertical direction and in a front-and-aft direction by driving mechanisms. The headrest arrangement comprises an outer stay and an inner stay which are vertically disposed in the seat back and vertically movable respectively by the driving mechanisms disposed in the seat back. The outer and inner stays are pivotally attached to a headrest body so that the headrest body is movable in a vertical direction and a front-and-aft direction under the vertical movement of the outer and inner stays. With this arrangement, since the headrest body is kept in a desired position without a fixing mechanism, the head rest arrangement is relatively simplified, thereby lowering a production cost. Additionally, since the driving mechanism of the headrest body is disposed in the seat back, the headrest body can be made relatively small-sized and light in weight, thereby realizing an improved safety upon reducing impact force from the headrest body to a passenger head without degrading passenger's comfortableness.

8 Claims, 5 Drawing Sheets

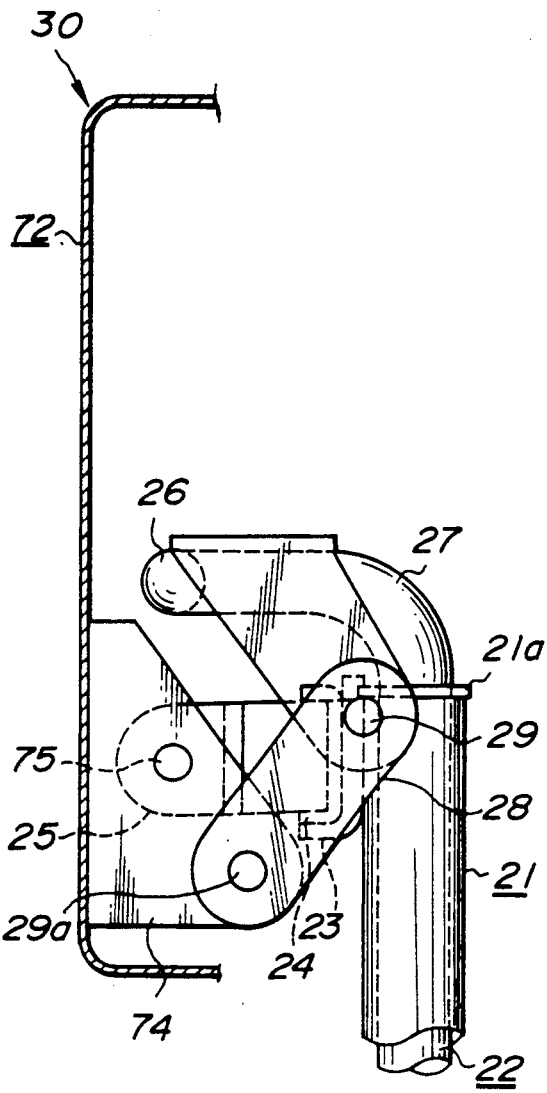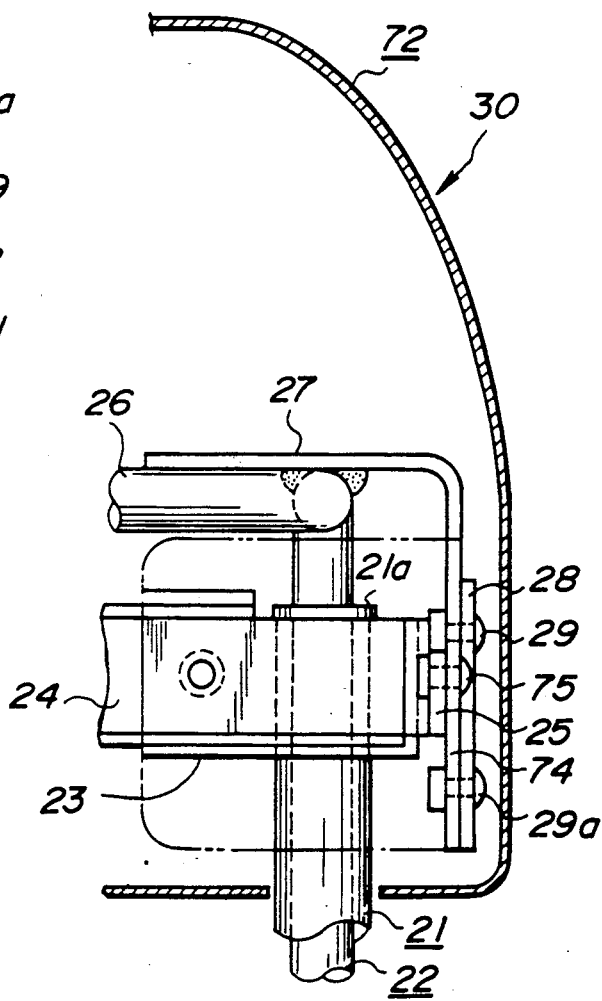

HEADREST ARRANGEMENT

SUMMARY OF THE INVENTION

1. Field of the Invention

The present invention relates to improvements in a headrest arrangement in which a headrest is attached to a seat back through a stay so as to be controllably movable in vertical and front-and-aft directions, and more particularly to the headrest arrangement in which the headrest is driven by driving motors installed in a seat of an automotive vehicle.

2. Description of the Prior Art

Hitherto a variety of a head rest arrangement has been proposed and put into practical use. In a typical one of these, one driving motor for vertically moving the headrest is disposed in the seat back while the other driving motor for moving the headrest in a front and rear direction is disposed in the headrest.

However, difficulties have been encountered in this conventional arrangement. Since the driving motor for moving the headrest in the front and rear directions is disposed in the headrest it is necessary that lead wires extending from the driving motors are distributed and connected to a car battery side before the seat back and the headrest are assembled in an automotive vehicle seat. Such wiring is too late to be accomplished after the assembly process of the seat back and the headrest. As a result, the assembly process is complicated so as to increase the steps of a production process, so that a production cost is increased. Additionally, since the driving mechanism is disposed in the headrest, the headrest becomes larger and heavier. This raises problems, i.e., the cushioning feeling of the headrest is lost since the pad member of the headrest must be smaller in thickness in order to maintain a certain headrest size as usual; and the safety of the headrest is degraded since a backward impact value to a passenger's head is increased.

SUMMARY OF THE INVENTION

It is an object of the present invention to provide an improved headrest arrangement which can overcome the problems encountered in the conventional headrest arrangement.

A headrest arrangement of the present invention is comprised of a seat back, an outer stay, an inner stay and a headrest. The outer stay is vertically disposed in the seat back and vertically movable by motive power relative to the seat back. The inner stay is vertically disposed along the outer stay and vertically movable by motive power relative to the outer stay. The headrest is swingably connected to the outer stay so that the headrest is swingingly movable between an upright position and a forward tilting position. The headrest is connected to the inner stay so that the headrest can swing when the inner stay vertically moves relative to the outer stay.

With this arrangement, since the outer stay and the inner stay are fixedly positioned without using a lock mechanism so that the headrest is fixedly positioned at a desired position, the head rest arrangement is simplified, thereby lowering the production cost. Furthermore, an internal mechanism of the headrest arrangement can be made relatively small-sized since the outer and inner driving mechanisms are installed in the seat back. This causes the headrest body to enable to have a sufficient thickness of a pad member covering the headrest body. Thus, the headrest body of the present invention can be made lighter in weight without degrading comfortableness in use, realizing the improvement in safety by reducing impact force from the seat back to a passenger head or the like.

BRIEF DESCRIPTION OF DRAWINGS

In the drawings, like reference numerals designate like elements and parts throughout the figures, in which:

FIG. 8 is a side view of an essential part of a third embodiment the headrest arrangement according to the present invention; and FIG. 9 is a front view of an essential part of a third embodiment of the headrest arrangement according to the present invention.

DETAILED DESCRIPTION OF THE INVENTION

Figure 1:
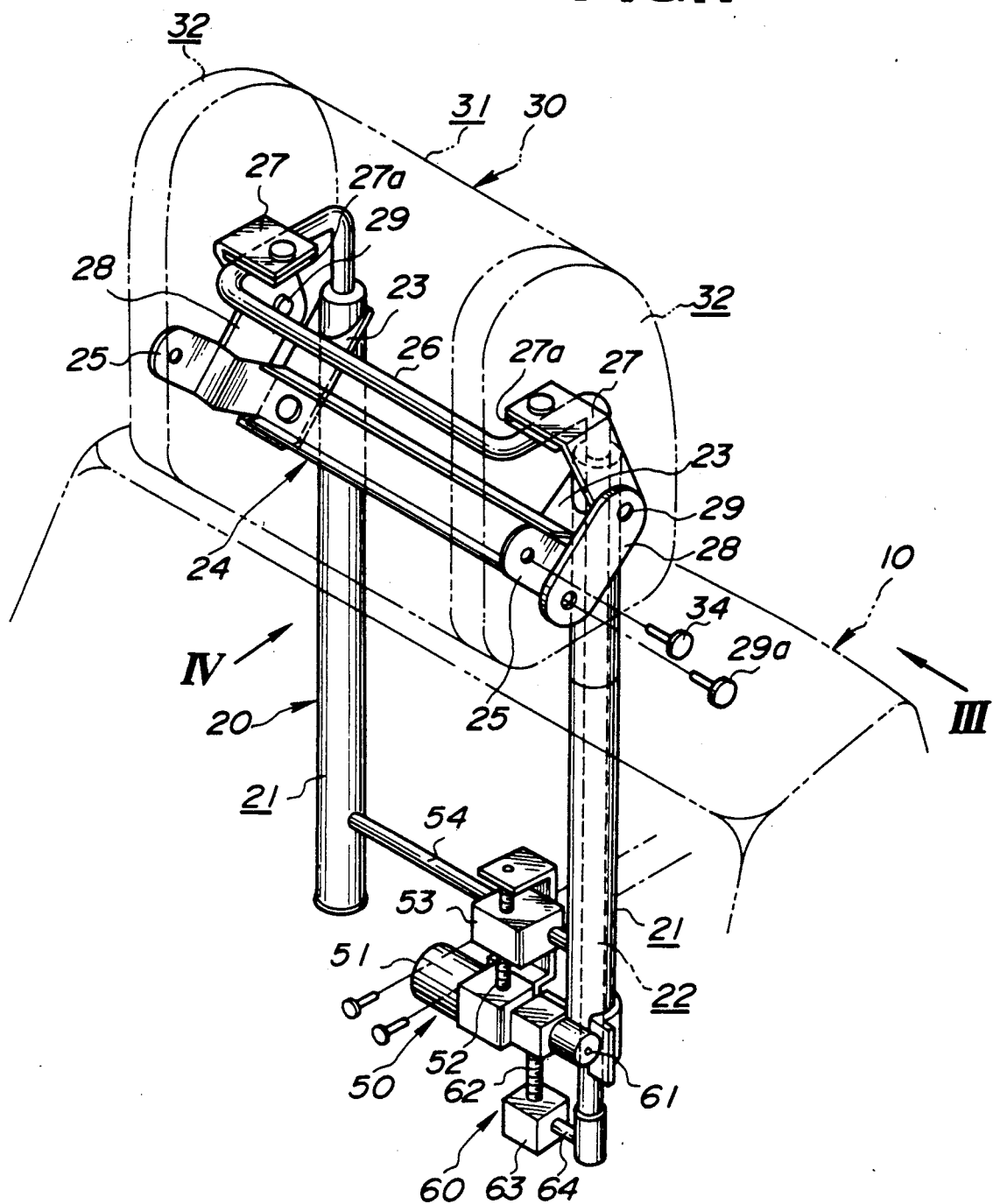
FIG. 1 is a perspective view of a first embodiment of a headrest arrangement according to the present invention.
Figure 2:
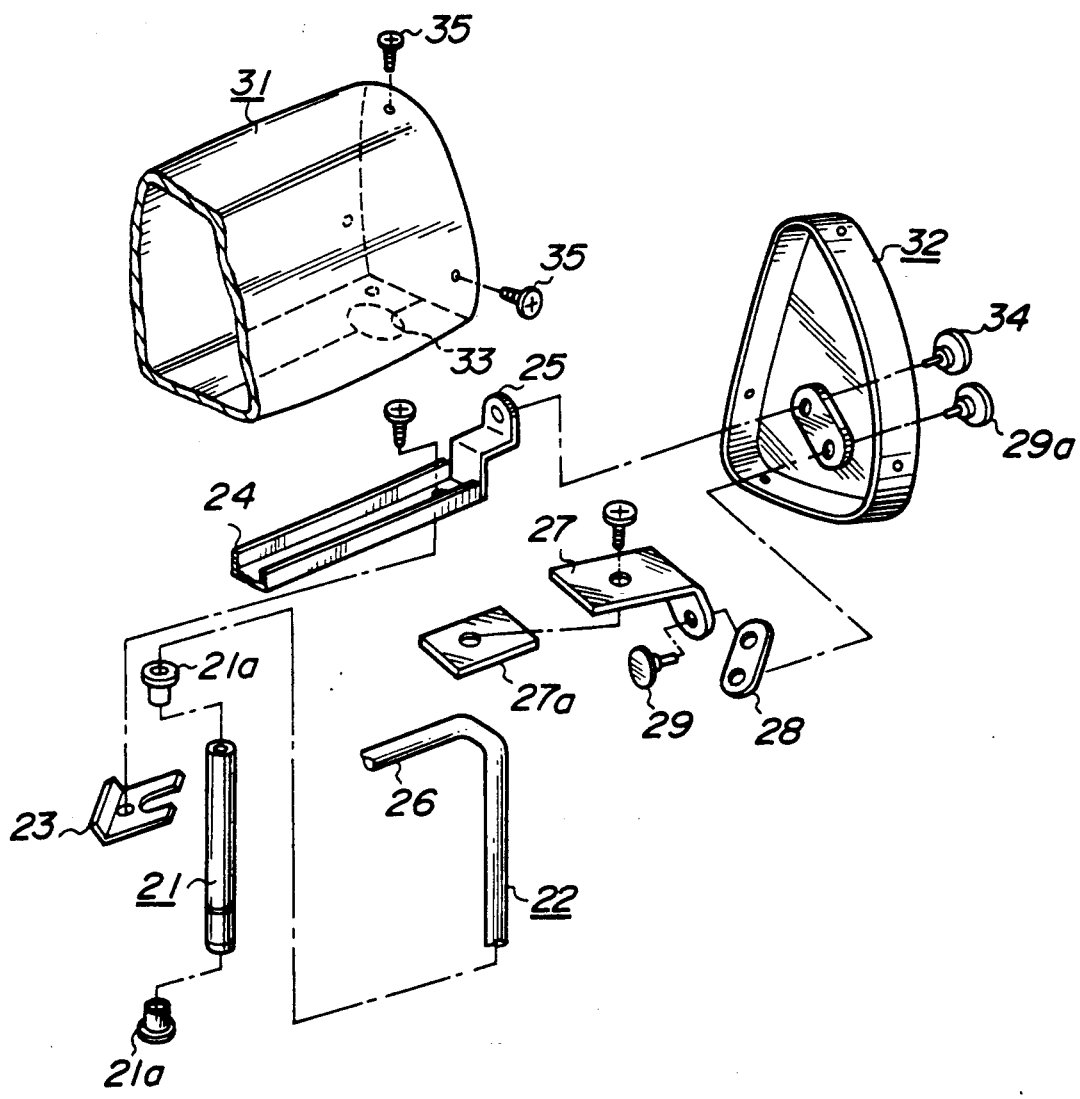
FIG. 2 is an exploded perspective view of an essential part of the headrest arrangement of FIG. 1.
Figure 3:
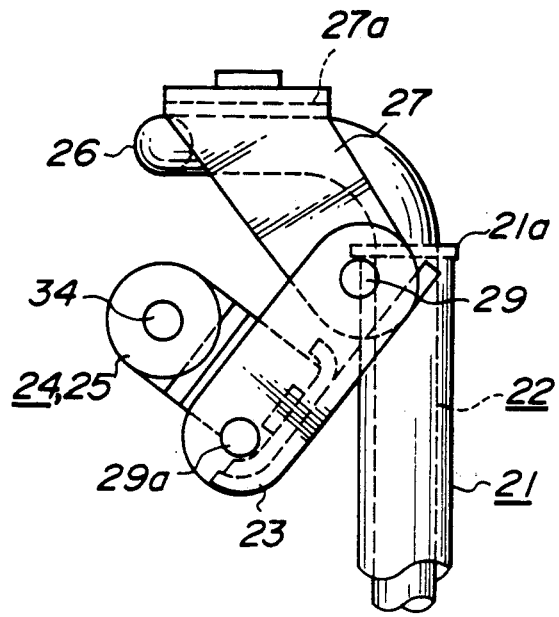
FIG. 3 is a side view of an essential part of the headrest arrangement of FIG. 1, as viewed from the direction of an arrow III in FIG. 1.
Figure 4:
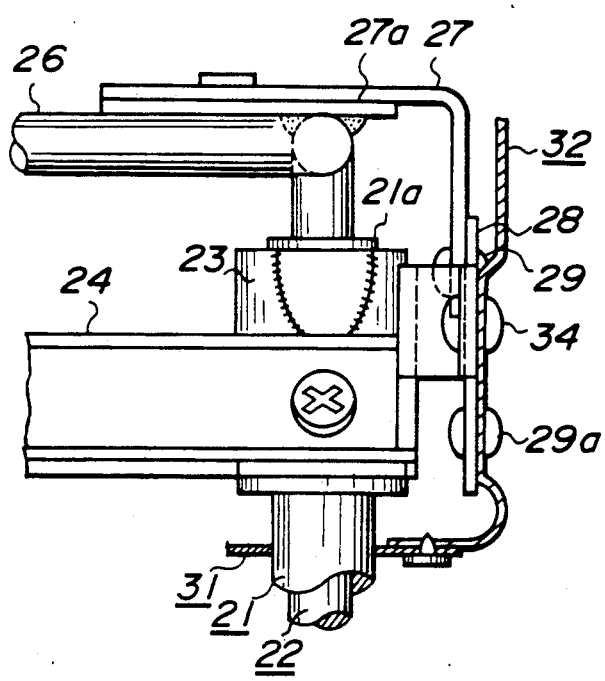
FIG. 4 is a front view of an essential part of the headrest of FIG. 1, as viewed from the an arrow IV in FIG. 1.

Referring now to FIGS. 1 to 4, a first embodiment of a headrest arrangement of an automobile seat according to the present invention is illustrated. As shown in FIGS. 1 and 2, a headrest body 30 is attached to a seat back 10 through a stay 20. The headrest body 30 comprises a cylindrical body member 31 which is provided with a pair of side members 32. The side members 32 are generally cup-shaped and fixedly attached to the body member 31 with small screws 35. A pair of elliptic openings 33 are formed at an under wall section of the body member 31 so that the stay 20 can penetrate the body member 31. The stay 20 comprises a pair of outer stays 21 in which an inner stay 22 is disposed. The pair of outer stays 21 are tube-shaped and vertically parallely disposed in the seat back 10. Furthermore, the outer stays 21 are vertically movably supported by a guide section (not shown) in the seat back 10. The inner stay 22 is generally U-shaped and disposed in the seat back 10 so that opposite ends of the o inner stay 22 vertically penetrates the outer stays 21 and are vertically movable relative to the outer stays 21. Inner stay guide members 21a made of plastic, are attached respectively at the upper and lower end sections of the outer stays 21 so as to vertically guide the leg sections of the inner stay 22 along the inner surface of the outer stays 21.

An outer stay driving mechanism 50 and an inner stay driving mechanism 60 are disposed in the seat back 10. The outer stay driving mechanism 50 serves to vertically move the outer stays 21 relative to the guide section. The inner stay driving mechanism 60 serves to vertically move the inner stay 22 relative to the outer stays 21.

The outer stay driving mechanism 50 comprises a driving motor 51 by which a screw member 52 is driven. The driving motor 51 produces motive power and is fixedly mounted in the seat back 10. The screw member 52 is drivably connected to the driving motor 51 and vertically extends from the driving motor 51 so as to be rotated under the rotation of the driving motor 51. The screw member 52 is vertically engagingly passed through a nut member 53 so that the nut member 53 can vertically shift under the rotation of the screw member 52. An output rod 54 laterally extends from the nut member 53 to the respective outer stays 21 so as to connect the nut member 53 and the outer stays 21.

The inner stay driving mechanism 60 comprises a driving motor 61 by which a screw member 62 is driven. The driving motor 61 produces motive power and is fixedly mounted at a lower end of the outer stays 21. The screw member 62 is drivably connected to the driving motor 61 and vertically extends so as to be rotated under the rotation of the driving motor 61. The screw member 62 is vertically engagingly passed through a nut member 63 so that the nut member 63 can vertically shift under the rotation of the screw member 62. An output pin 64 extends from the nut member 63 to the lower end section of the inner stay 22.

As shown in FIGS. 1 to 4, an end of a supporting bracket 23 is fixedly connected to an upper end section of the outer stay 21 and extends in a forward direction. A connecting member 24 is fixedly secured to the other end of the supporting bracket 23. The connecting member 24 comprises a pair of flanges 25 formed respectively at the opposite ends of the connecting member 24 so that the flanges 25 are formed respectively along the inner surfaces of the both side members 32 of the headrest body 30. The flanges 25 are connected respectively to the base end sections of the both side members 32 of the headrest body 30 with pin members 34 so that the headrest body 30 is supported to the outer stay 21 to be swingable between its upright position and its front tilting position An end of each of two connecting brackets 27 is fixedly secured through a plate member 27a to each end portion of the horizontal section 26 which forms an upper section of the inner stay 22. The connecting bracket 27 is formed along the inner surface of the side member 32 of the headrest body 30. An end of a link member 28 is pivotally connected to the other end of the connecting bracket 27 with a pin member 29. The other end of the link member 28 is pivotally connected to the lower end section of the side members 32 of the headrest body 30 with a pin member 29a.

With the above-discussed arrangement, in an assembly process, before the headrest body 30 is installed to the seat back 10, the seat back 10 is set in a condition in which the stay 20 and the outer and inner stay driving mechanisms 50, 60 have been installed completing wiring of the lead wire or the like to the driving motor 51, 61.

The connecting member 24 is fixedly secured with a small screw (no numeral) to the supporting bracket 23 which is fixedly attached to the upper end sections of the outer stays 21. The connecting bracket 27 connected to the link member 28 is fixedly secured with a small screw (no numeral) to the plate member 27a which is fixedly secured to the generally horizontal section 26 of the inner stay 22.

In a condition where each of the side members 32 of the headrest body 30 has been disposed along the flanges 25 of the connecting member 24 and the link member 28, each of the flanges 25 of the connecting members 24 is pivotally supported to each base section of the both side members 32 with a pin member 34. Additionally, the link member 28 is pivotally connected to the lower end section of side members 32 with the pin member 29a.

The body member 31 covers an inner mechanism comprising the connecting member 24, the connecting bracket 27, the link member 28 and the like. The side members 32 are fixedly secured respectively to the opposite ends of the body member 31. Additionally, the headrest body 30 including the inner mechanism is covered with a pad member (not shown).

With this headrest arrangement assembled by way of the above-mentioned procedure, in order to vertically adjust the headrest body 30 to a desired position, it is sufficient merely to rotate the driving motor 51 in a predetermined direction. By this operation, the screw member 52 rotates and the nut member 53 vertically shifts. Additionally, the output rod 54 shifts with the nut member 53 in a vertical direction as a one-piece member. This causes the connecting member 24 of the outer stay 21 and the link member 28 of the inner stay 22 to simultaneously vertically move keeping a predetermined distance between the connecting member 24 and the link member 28. Thus, an initial inclined angle of the headrest body 30 is maintained when the headrest body 30 moves in a vertical direction.

When the driving motor 51 is stopped in rotation under a condition where the headrest body 30 has been vertically adjusted to the desired position, the outer stay 21 and the inner stay 22 are stopped in vertical movement thereby maintaining the headrest body 30 to stay at the position under the action of the outer driving mechanism 50 and the inner driving mechanism 60. This causes the headrest body 30 to be kept at the desired vertical position.

In order to adjust the headrest body 30 at a desired position in front and rear directions, it is sufficient merely to rotate the driving motor 61 in a predetermined direction under a condition where the driving motor 51 is kept in a stopping state. By this operation, the inner stay 22 vertically moves to keep the outer stay in the initial position.

The connecting bracket 27 vertically moves with the inner stay 22 as a one-piece member when the inner stay 22 moves in a vertical direction. Therefore, each of top end sections of the both side members 32 of the headrest body 30 vertically shift through the link member 28, and then the headrest body 30 swings around the base end section of the both side sections of the headrest body 30.

When the driving motor 61 is stopped in rotation under a condition the headrest body has been moved to the desired position in the front and rear direction, the headrest body 30 is kept at the desired position 0 in the front and rear direction through the outer stay 21 and the inner stay 22. Furthermore, it will be understood that the headrest body 30 may be simultaneously adjusted in a vertical direction and in the front and rear direction, in which driving motors 51, 61 are simultaneously rotated.

Figure 5:
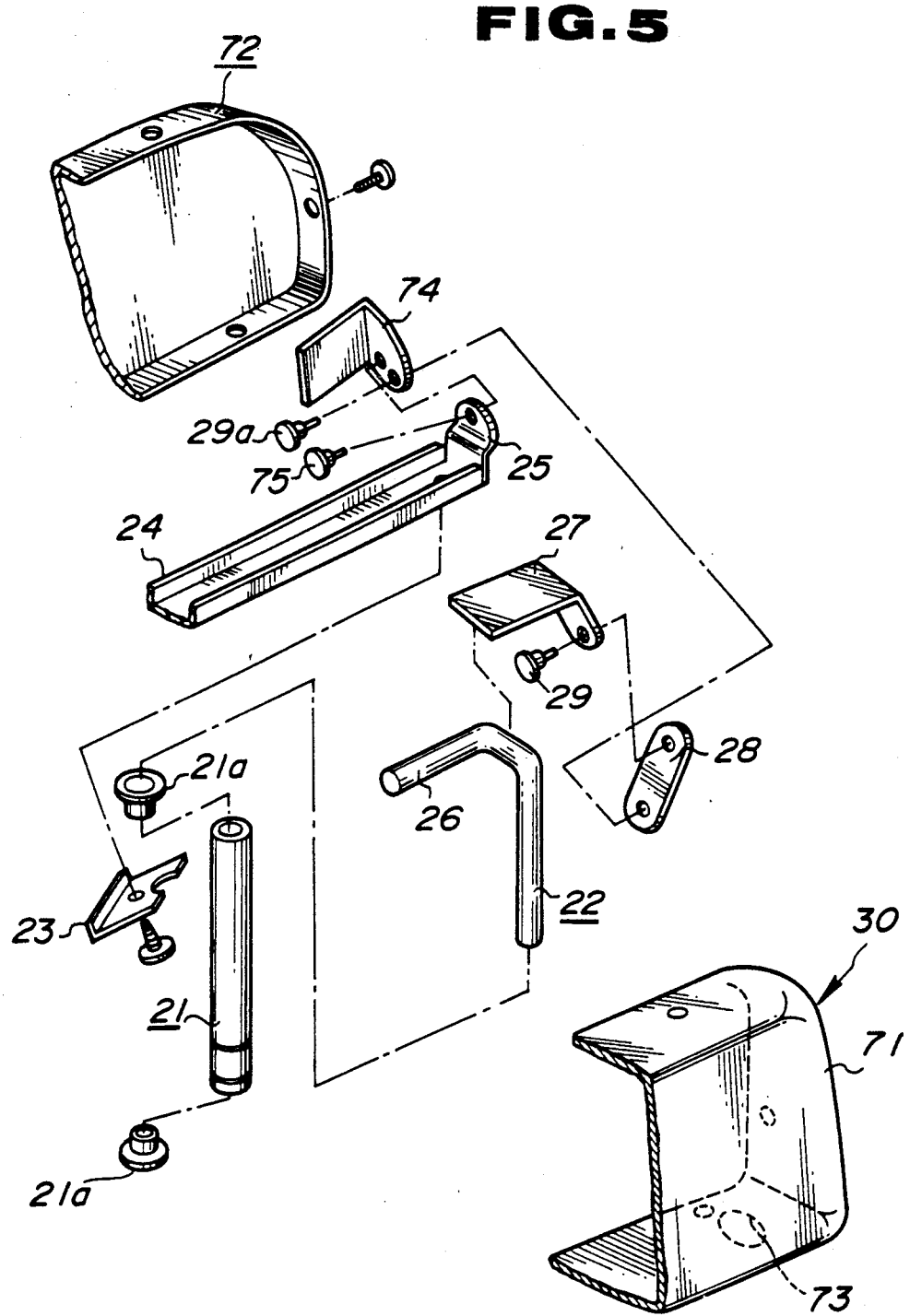
FIG. 5 is an exploded perspective view of an essential par a second embodiment of the headrest arrangement according to the present invention.
Figure 6:
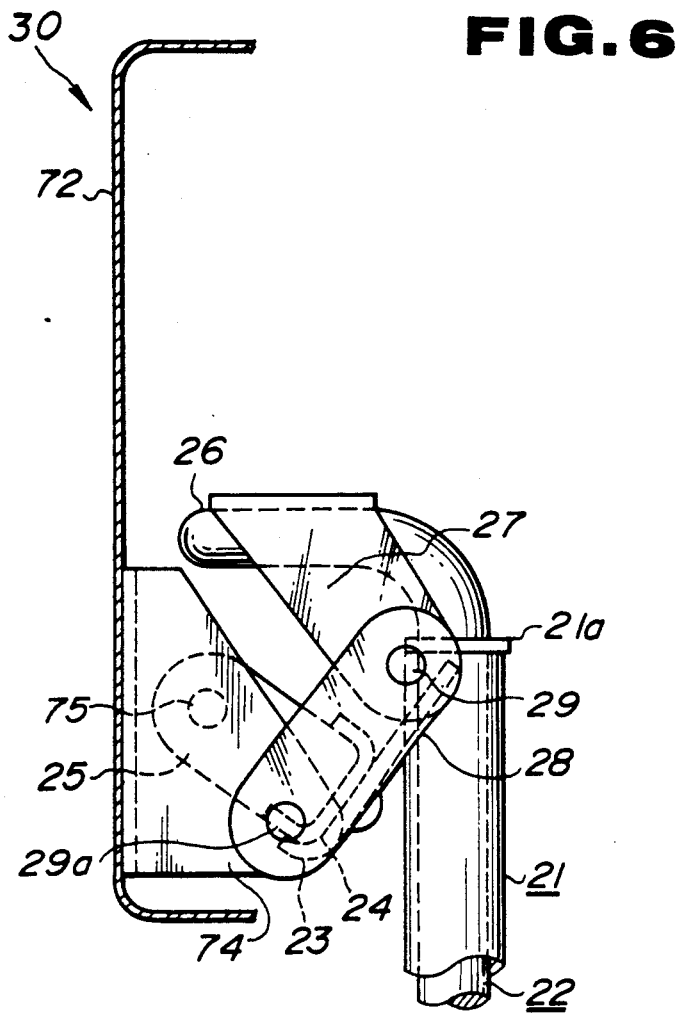
FIG. 6 is a side view of an essential part of the second embodiment of the headrest arrangement according to the present invention.
Figure 7:
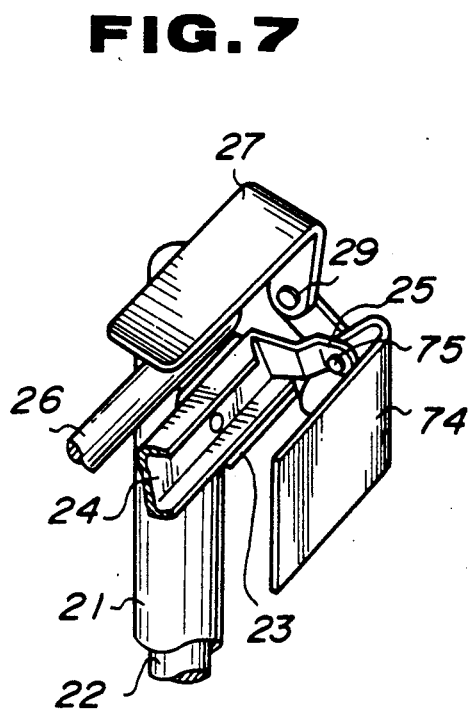
FIG. 7 is a perspective view of an essential part of the second embodiment of the headrest arrangement according to the present invention.

FIGS. 5 to 7 illustrate a second embodiment of the headrest arrangement of the present invention. In this embodiment, the headrest body 30 comprises a body member 71 to which a front cover member 72 is incorporated. The body member 71 is generally box-shaped and has an opening opened in the front direction. The opening of the body member 71 is covered with the front cover member 72. An elliptic opening 73 is formed at the under wall of the body member 71 in order that the outer stay 21 passes through the opening 73. A connecting bracket 74 is fixedly secured to the front cover member 72 and extends in a rearward direction. The connecting bracket 74 is swingably supported to the connecting member 24 of the outer stay 21 with a pin member 75. The link member 28 is connected to the top end of the connecting bracket 74.

With this structure, the headrest body 30 is installed to the seat back 10 through the stay 20 by an operation in which the connecting member 24 and the link member 28 are connected to the connecting bracket 74 disposed in the side of the front cover member 72, followed by securing the front cover member 72 and the body member 71 with small screws.

FIGS. 8 and 9 illustrate a third embodiment of the headrest arrangement according to the present invention. In this embodiment, the supporting bracket 23 is fixedly secured to the top end of the outer stay 21 along the outer stay 21. The connecting member 24 is fixedly secured to the supporting bracket 23 and extends in a forward direction. A supporting bracket 74 is supported to the flanges 25 which extend in a forward direction. With this structure, a front and rear directional force applied to the headrest body 30 is linearly transmitted to the outer stay 21 through the connecting member 24 and supporting bracket 74, so that the headrest body 30 has a sufficient rigidity against the front and rear directional force.

Although the connecting bracket 27 and the headrest body 30 have been shown and described as being connected through the link member 28 in the above-mentioned embodiment, the connecting bracket 27 and the headrest body 30 may be directly integrally connected without the link member 28. Furthermore, the headrest body 30 may be directly connected to the inner stay 22 if a pin member inserted to the inner stay 22 is slidably connected to a slot formed in the headrest body 30.

With the headrest arrangement of the above-mentioned embodiments, since the outer stay 21 the inner stay 22 are fixedly positioned without using a special lock mechanism so that the headrest body 30 is kept at a desired position, the headrest arrangement is relatively simplified, thereby lowering a production cost. Furthermore, the internal mechanism of the headrest arrangement can be made relatively small-sized since the outer and inner driving mechanisms 50, 60 are installed in the seat back 10. This causes the headrest body 30 to enable to have a sufficient thickness of a pad member covering the headrest body 30. Thus, the headrest body 30 of the present invention can be made lighter in weight without degrading its good feeling in use, realizing an improvement in safety by reducing impact from the headrest to a passenger's head.

What is claimed is:

1. A headrest arrangement for a seat, comprising:
a first stay disposed in a seat back of the seat and vertically extending, said first stay being vertically movable by motive power relative to said seat back;
a second stay disposed parallel with said first stay and along said first stay, said second stay being vertically movable along said first stay by motive power;
a headrest swingably connected to said first stay so that said headrest is swingingly movable between a first position and a second position; and
means for connecting said headrest and said second stay so that said headrest swings when said second stay moves vertically and relative to said first stay.

2. A headrest arrangement for a seat, comprising:
an outer stay disposed in a seat back and vertically extending, said outer stay being vertically movable relative to said seat back;
an inner stay vertically disposed along and inside said outer stay, said inner stay vertically movable relative to said outer stay;
a headrest having a base end section which is pivotally connected to said outer stay so that said headrest is swingingly movable between an upright positioned a forward tilting position;
means for connecting said headrest and said inner stay so that said headrest swings around said base end section of said headrest when said inner stay moves vertically and relative to said outer stay;
means for vertically driving said outer stay, said means installed in said seat back; and
means for driving said inner stay, said means installed in said seat back.

3. A headrest arrangement as claimed in claim 2, wherein said connecting means includes a link member having a first end section pivotally connected to said inner stay, and a second end section pivotally connected to said headrest.

4. A headrest arrangement as claimed in claim 3, further comprising means for connecting said headrest base end section and said outer stay, said connecting means including an outer stay connecting member having a first section fixedly secured to said outer stay, and a second section pivotally connected to said headrest.

5. A headrest arrangement as claimed in claim 4, wherein said second end section of said link member is pivotally connected to a first portion of said base end section of said headrest, and said second section of said outer stay connecting member is pivotally connected to a second portion of said base end section of said headrest, said first and second portions being separate from each other.

6. A headrest arrangement as claimed in claim 2, wherein said headrest includes a body member, and a pair of generally cup-shaped side members fixedly attached to said body member.

7. A headrest arrangement as claimed in claim 2, wherein said headrest includes a generally cup-shaped body member, and a generally cup-shaped front cover member fixedly attached to said body member.

8. A headrest arrangement as claimed in claim 2, wherein said outer stay and inner stay driving means include electric motors, respectively, which are connected to a car battery.

* * * * *